US012638119B2

(12) United States Patent
Rogers

(10) Patent No.: US 12,638,119 B2
(45) Date of Patent: May 26, 2026

(54) SYSTEM PULSATION DAMPENER DEVICE(S)

(71) Applicant: Performance Pulsation Control, Inc., Richardson, TX (US)

(72) Inventor: John Thomas Rogers, Garland, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 186 days.

(21) Appl. No.: 16/157,952

(22) Filed: Oct. 11, 2018

(65) Prior Publication Data

US 2019/0128462 A1 May 2, 2019

Related U.S. Application Data

(60) Provisional application No. 62/635,374, filed on Feb. 26, 2018, provisional application No. 62/577,567, filed on Oct. 26, 2017.

(51) Int. Cl.
*F16L 55/04* (2006.01)
*E21B 21/01* (2006.01)
(Continued)

(52) U.S. Cl.
CPC .............. *F16L 55/04* (2013.01); *E21B 21/01* (2013.01); *F16L 55/02718* (2013.01); *E21B 47/18* (2013.01)

(58) Field of Classification Search
CPC ...................................................... F15D 1/025
(Continued)

(56) References Cited

U.S. PATENT DOCUMENTS

| | | | | |
|---|---|---|---|---|
| 2,290,337 A | * | 7/1942 | Knauth | F16L 55/04 |
| | | | | 138/30 |
| 2,757,689 A | | 8/1956 | Knox | |

(Continued)

FOREIGN PATENT DOCUMENTS

CN 204239223 U 4/2015

OTHER PUBLICATIONS

Notification of Transmittal of the International Search Report and the Written Opinion of the International Searching Authority, or the Declaration dated Jul. 21, 2020 in connection with International Patent Application No. PCT/ US2020/31335, 10 pages.

(Continued)

*Primary Examiner* — Kenneth Rinehart
*Assistant Examiner* — Richard K. Durden

(57) ABSTRACT

A fluid delivery system including a pulsation dampener coupled between a standpipe manifold and a standpipe is provided. The fluid delivery system includes a fluid reservoir, a fluid pump, a manifold, a pulsation dampener, and piping. The fluid reservoir stores a fluid used for a drilling procedure. The fluid pump pumps the fluid from the fluid reservoir through the fluid delivery system. The manifold is located downstream from the fluid pump, and receives and combines fluids from the at least one fluid pump. The pulsation dampener receives the combined fluid from the manifold, and dampens residual pulsations from the manifold. The piping receives fluid output from the pulsation dampener, and transfers the fluid received from the pulsation dampener further downstream.

20 Claims, 9 Drawing Sheets

(51) Int. Cl.
*E21B 47/18* (2012.01)
*F16L 55/027* (2006.01)
(58) Field of Classification Search
USPC .......................................................... 138/40
See application file for complete search history.

(56) References Cited

U.S. PATENT DOCUMENTS

| | | | | |
|---|---|---|---|---|
| 2,773,455 A * | 12/1956 | Mercier | ................ | F16L 55/052 |
| | | | | 417/540 |
| 3,353,496 A | 11/1967 | Everett | | |
| 3,587,652 A | 6/1971 | Remus | | |
| 3,665,965 A * | 5/1972 | Baumann | ................ | F16L 55/04 |
| | | | | 138/42 |
| 3,731,709 A | 5/1973 | Glover | | |
| 3,840,051 A * | 10/1974 | Akashi | ...................... | G01F 1/40 |
| | | | | 138/37 |
| 3,894,562 A | 7/1975 | Moseley, Jr. et al. | | |
| 4,269,569 A | 5/1981 | Hoover | | |
| 4,445,829 A * | 5/1984 | Miller | ..................... | F16L 55/05 |
| | | | | 137/565.34 |
| 4,514,151 A | 4/1985 | Anders et al. | | |
| 4,570,745 A | 2/1986 | Sparks et al. | | |
| 4,585,400 A | 4/1986 | Miller | | |
| 5,495,872 A * | 3/1996 | Gallagher | ................ | F15D 1/025 |
| | | | | 138/40 |
| 5,860,799 A | 1/1999 | Scheibe et al. | | |
| 5,868,168 A | 2/1999 | Mott et al. | | |
| 6,155,803 A | 12/2000 | Curington et al. | | |
| 6,741,185 B2 * | 5/2004 | Shi | ...................... | G01V 11/002 |
| | | | | 340/853.2 |
| 6,848,477 B2 * | 2/2005 | Treusch | ............. | F02M 37/0017 |
| | | | | 123/456 |
| 7,051,765 B1 * | 5/2006 | Kelley | ...................... | F15D 1/02 |
| | | | | 138/40 |
| 7,123,161 B2 | 10/2006 | Jeffryes et al. | | |
| 7,198,102 B2 | 4/2007 | Virally et al. | | |
| 7,345,594 B2 * | 3/2008 | Huang | ................ | G01V 11/002 |
| | | | | 340/854.3 |
| 8,449,500 B2 | 5/2013 | DelCastillo et al. | | |
| 9,624,799 B1 | 4/2017 | Ferguson | | |
| 9,845,795 B2 | 12/2017 | Manley | | |
| 2003/0143088 A1 | 7/2003 | Welch | | |
| 2004/0241024 A1 | 12/2004 | Bradford, Jr. | | |
| 2006/0109141 A1 | 5/2006 | Huang et al. | | |
| 2012/0152360 A1 | 6/2012 | Marica | | |
| 2012/0189477 A1 | 7/2012 | Rogers | | |
| 2013/0037153 A1 | 2/2013 | Schommer | | |
| 2014/0076577 A1 * | 3/2014 | Shampine | ............. | F16L 55/041 |
| | | | | 166/373 |
| 2014/0118157 A1 | 5/2014 | Jamison | | |
| 2015/0064027 A1 | 3/2015 | Leugemors et al. | | |
| 2015/0096639 A1 | 4/2015 | Rogers et al. | | |
| 2015/0240982 A1 | 8/2015 | Eisner et al. | | |
| 2015/0284811 A1 * | 10/2015 | Knight | ................. | C12Q 1/6874 |
| | | | | 506/2 |
| 2017/0067456 A1 | 3/2017 | Manley et al. | | |
| 2017/0159868 A1 * | 6/2017 | Fisher | ............... | F16L 55/02718 |
| 2018/0128410 A1 | 5/2018 | Rogers | | |
| 2019/0128462 A1 | 5/2019 | Rogers | | |
| 2019/0257462 A1 | 8/2019 | Rogers | | |
| 2019/0285220 A1 | 9/2019 | Eros et al. | | |
| 2019/0293058 A1 | 9/2019 | Manley | | |
| 2020/0132237 A1 | 4/2020 | Rogers | | |

OTHER PUBLICATIONS

Notification of Transmittal of the International Search Report and the Written Opinion of the International Searching Authority, or the Declaration dated Jul. 31, 2020 in connection with International Patent Application No. PCT/US2020/31698, 9 pages.

ISA/US, "International Search Report and Written Opinion of the International Searching Authority," International Application No. PCT/US2018/055485, Dec. 10, 2018, 13 pages.
United States Trademark Registration No. 5,127,212—Charge Free Conversion Kit, 2 pages.
Sigma Drilling Technology, LLC, commercial website, screenshots obtained Nov. 22, 2019; effective date Oct. 1, 2014—see Sigma Drilling Technologies "Terms & Conditions" final sentence, 23 pages.
Hon. Amos L. Mazzant, III, Report on the Filing or Determination of an Action Regarding a Patent or Trademark Re:U.S. Appl. No. 61/878,174, filed Sep. 16, 2013, Justin Manley; U.S. Appl. No. 62/037,901, filed Aug. 14, 2014, Justin Manley; U.S. Appl. No. 14/846,872, filed Sep. 7, 2015, Justin Manley and William Garfield, Judgment Entered May 9, 2019; Case 4:17-cv-00450-ALM *Performance Pulsation Control, Inc.* v. *Sigma Drilling Technologies, LLC,* Justin P. Manley, et al. United States District Court, Eastern District of Texas, Sherman Division, 1 page.
Office Action dated Oct. 13, 2020 in connection with U.S. Appl. No. 16/404,248, 24 pages.
Final Office Action dated Apr. 16, 2021 in connection with U.S. Appl. No. 16/404,248, 18 pages.
Non-final Office Action dated Dec. 13, 2021, in connection with U.S. Appl. No. 16/404,248, 9 pages.
Office Action dated Dec. 13, 2021 in connection with U.S. Appl. No. 16/404,248, 9 pages.
Office Action dated Sep. 27, 2021 in connection with U.S. Appl. No. 16/730,621, 26 pages.
Interview Summary dated Oct. 29, 2021 in connection with U.S. Appl. No. 16/730,621, 3 pages.
International Search Report and Written Opinion of the International Searching Authority dated Jan. 19, 2022, in connection with International Application No. PCT/US2021/054621, 9 pages.
Office Action dated Jun. 16, 2022, in connection with Algerian Application No. DZ/P/2021/000753, 3 pages.
Examination report dated Apr. 29, 2022, in connection with Indian Application No. 202127055212, 5 pages.
Notice of Allowance dated Jun. 9, 2022, in connection with U.S. Appl. No. 16/404,248, 17 pages.
Notice of Allowance dated May 26, 2022, in connection with U.S. Appl. No. 16/730,621, 17 pages.
Non-final Office Action dated Jun. 13, 2022, in connection with U.S. Appl. No. 17/450,673, 15 pages.
Office Action dated Aug. 16, 2022 in connection with India Patent Application No. 202127055213, 5 pages.
Office Action dated Sep. 16, 2022 in connection with Eurasian Patent Application No. 202193033, 4 pages.
Office Action dated Jan. 27, 2023, in connection with Canadian Application No. 3,139,502, 4 pages.
Office Action dated Jan. 16, 2023, in connection with Canadian Application No. 3,139,699, 9 pages.
Office Action dated Feb. 15, 2023, in connection with Mexican Application No. MX/a/2021/013600, 11 pages.
Office Action dated Nov. 9, 2022 in connection with Eurasian Patent Application No. 202193034, 4 pages.
Supplementary European Search Report dated Dec. 13, 2022 in connection with European Patent Application No. 20 80 2519, 11 pages.
Supplementary European Search Report dated Dec. 13, 2022 in connection with European Patent Application No. 20 80 2300, 10 pages.
Office Action dated Oct. 29, 2022 in connection with Saudi Arabia Patent Application No. 521430784, 9 pages.
Office Action dated Oct. 31, 2022 in connection with Saudi Arabia Patent Application No. 521430785, 11 pages.
Official Action dated Feb. 28, 2023, in connection with Eurasian Application No. 202193033, 6 pages.
Notification of Readiness to Grant dated Mar. 28, 2023, in connection with Eurasian Application No. 202193034, 6 pages.
Office Action dated Mar. 31, 2023, in connection with Indonesian Application No. P00202111021, 9 pages.
Resolution of Notification of the Expert Report (new law) dated Mar. 16, 2023, in connection with Chilean Application No. 2021-002941, 34 pages.

(56)                    References Cited

OTHER PUBLICATIONS

Resolution of Notification of the Expert Report (new law) dated Mar. 16, 2023, in connection with Chilean Application No. 2021-002942, 32 pages.
Notice of Allowance dated Jul. 6, 2023, in connection with Canadian Application No. 3,139,699, 1 page.
Technical Report dated Jul. 3, 2023, in connection with Egyptian Application No. PCT 1770/2021, 4 pages.
Technical Report dated Jul. 3, 2023, in connection with Egyptian Application No. PCT 1771/2021, 5 pages.
Notice of the Result of Substantive Examination dated Jul. 14, 2023, in connection with Indonesian Application No. P00202111025, 6 pages.
Office Action dated Jun. 8, 2023, in connection with Mexican Application No. MX/a/2021/013599, 6 pages.
Written Opinion dated Aug. 1, 2025, in connection with Brazilian Application No. BR112021022309-6, 11 pages.
Office Action dated Sep. 30, 2025, in connection with Mexican Application No. MX/a/2023/004210, 6 pages.
Office Action dated Feb. 12, 2025, in connection with Uzbekistan Application No. IAP20210589, 6 pages.
Office Action dated Feb. 12, 2025, in connection with Uzbekistan Application No. IAP20210588, 6 pages.
Search Report and Opinion dated Feb. 24, 2025, in connection with Brazilian Application No. BR112023006847-9, 8 pages.
Technical Examination Report dated Aug. 20, 2025, in connection with Brazilian Patent Application No. BR112023006847-9, 6 pages.
Substantive Examination Adverse Report dated Dec. 30, 2024, in connection with Malaysian Application No. PI2021006614, 4 pages.
Office action dated Dec. 26, 2023, in connection with Brazilian Patent Application No. 112021022309-6, 10 pages.
Office Action dated Jan. 22, 2024, in connection with Columbian Patent Application No. NC2021/0016454, 15 pages.
Office Action dated Jan. 22, 2024, in connection with Columbian Patent Application No. NC20210016491, 17 pages.
Office Action dated Jan. 24, 2024, in connection with Chilean Patent Application No. 2021-02941, 2 pages.

Hearing Notice dated Feb. 21, 2024, in connection with Indian Patent Application No. 202127055213, 2 pages.
Examination Report dated Feb. 5, 2024, in connection with Kuwait Patent Application No. KW/P/2021/445, 7 pages.
Office Action and Examination Search Report dated Aug. 26, 2024, in connection with Canadian Application No. 3,198,622, 3 pages.
Notice of allowance dated Aug. 29, 2024, in connection with Vietnam Application No. 1-2021-07779, 2 pages.
Office Action Summary (Examination Result) dated Oct. 6, 2024, in connection with United Arab Emirates Application No. P6002003/2021, 7 pages.
Office Action Summary (Examination Result) dated Oct. 7, 2024, in connection with United Arab Emirates Application No. P6002004/2021, 7 pages.
Communication pursuant to Article 94(3) EPC dated Oct. 18, 2024, in connection with European Patent Application No. 20802300.2, 6 pages.
Communication pursuant to Article 94(3) dated Oct. 28, 2024, in connection with European Application No. 20802519.7, 7 pages.
Substantive Examination dated Apr. 23, 2025, in connection with Malaysia Application No. PI2021006622, 4 pages.
Notification of Readiness to Grant a Eurasian Patent dated Oct. 17, 2023, in connection with Eurasian Patent Application No. 202193033, 7 pages.
Resolution of acceptance for registration dated Oct. 24, 2023, in connection with Chilean Patent Application No. 2021-02942, 2 pages.
Resolution for notification of the expert dated Oct. 13, 2023, in connection with Chilean Patent Application No. 2021-02941, 32 pages.
Result of examination dated Oct. 31, 2023, in connection with Vietnam Patent Application No. 1-2021-07778, 2 pages.
Communication pursuant to Article 94(3) EPC dated Mar. 10, 2026, in connection with European Application No. 20802519.7, 7 pages.
Brazilian Patent and Trademark Office publication in the Official Gazette dated Jan. 21, 2026 and Office Action in connection with Brazilian Application No. BR112021022309-6, 9 pages.

* cited by examiner

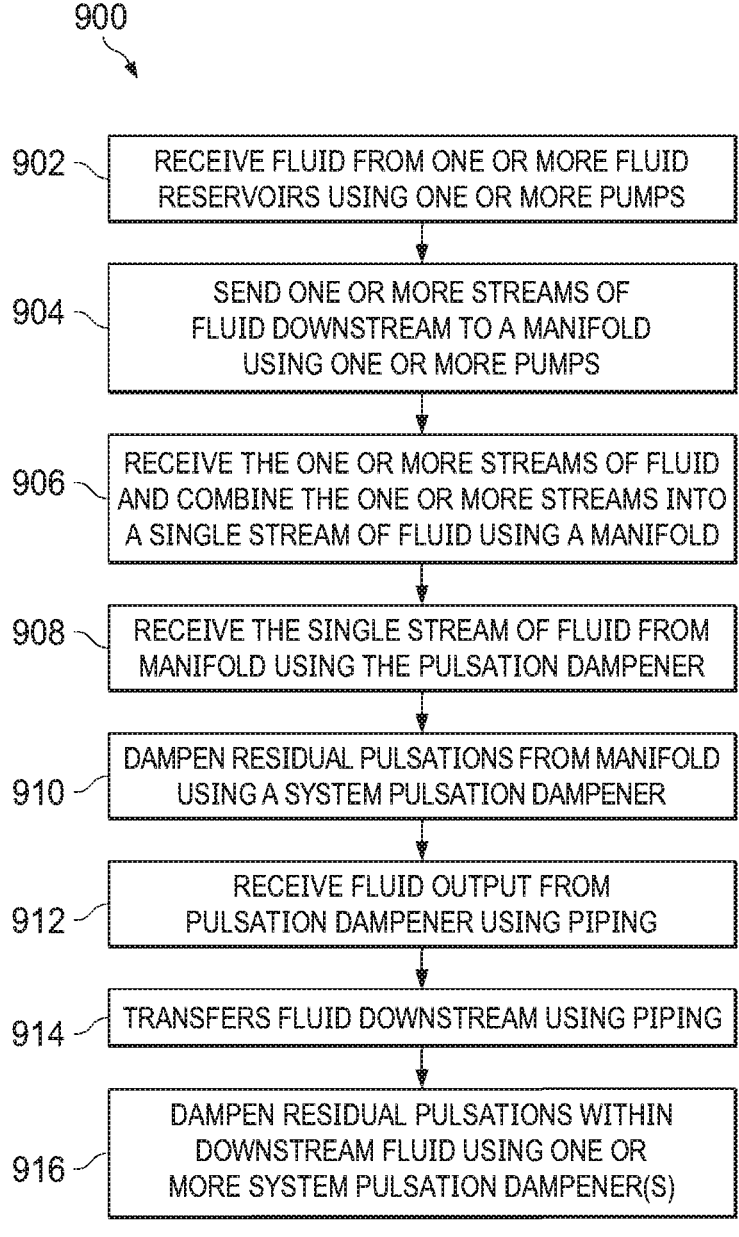

900

902 — RECEIVE FLUID FROM ONE OR MORE FLUID RESERVOIRS USING ONE OR MORE PUMPS

904 — SEND ONE OR MORE STREAMS OF FLUID DOWNSTREAM TO A MANIFOLD USING ONE OR MORE PUMPS

906 — RECEIVE THE ONE OR MORE STREAMS OF FLUID AND COMBINE THE ONE OR MORE STREAMS INTO A SINGLE STREAM OF FLUID USING A MANIFOLD

908 — RECEIVE THE SINGLE STREAM OF FLUID FROM MANIFOLD USING THE PULSATION DAMPENER

910 — DAMPEN RESIDUAL PULSATIONS FROM MANIFOLD USING A SYSTEM PULSATION DAMPENER

912 — RECEIVE FLUID OUTPUT FROM PULSATION DAMPENER USING PIPING

914 — TRANSFERS FLUID DOWNSTREAM USING PIPING

916 — DAMPEN RESIDUAL PULSATIONS WITHIN DOWNSTREAM FLUID USING ONE OR MORE SYSTEM PULSATION DAMPENER(S)

FIG. 9

SYSTEM PULSATION DAMPENER DEVICE(S)

PRIORITY CLAIM

This application claims priority to U.S. Provisional Patent Application No. 62/577,567 filed Oct. 26, 2017 and entitled COMBINATION STANDPIPE MANIFOLD AND PULSATION DAMPENER DEVICE and U.S. Provisional Patent Application No. 62/635,374 filed Feb. 26, 2018 and entitled SYSTEM PULSATION DAMPENER DEVICE(S). The content of the above-identified patent documents is incorporated herein by reference.

TECHNICAL FIELD

The present application relates generally to the operation of reciprocating fluid transfer systems and, more specifically, to providing one or more pulsation control products and/or devices after fluid flow aggregation structures, such as between a standpipe manifold and a standpipe or after multi-flow fluid stream consolidation, and before connecting to a top drive or swivel in a drilling rig, and/or at other non-traditional locations for pulsation dampeners.

BACKGROUND

Pulsation control in fluid transfer systems is in constant need of improvement. Among the improvements desirable are reducing pulsation amplitudes from pumps to the downstream system and increasing flexibility in integration of pulsation dampeners with other elements of an overall pump system.

SUMMARY

A fluid delivery system includes a pulsation dampener coupled between a standpipe manifold and a standpipe, or within the standpipe, or after multi-flow fluid stream consolidation, or at other locations along the fluid flow path after the standpipe or consolidation but (preferably) before the fluid enters the top drive or swivel. Individually or in combination, these "system" pulsation dampener device(s) are situated in non-traditional locations along the fluid flow path but may be used together with a "main" or conventional pulsation dampener at the outlet of the mud pump, typically acting as supplementary pulsation dampening device(s). Alternatively, one or more system pulsation dampener device(s) may be used in lieu of a pulsation dampener located conventionally at the outlet of the mud pump. In a simple form, the system pulsation dampener device(s) may be an orifice with resistance (e.g., an orifice plate). Alternatively, the system pulsation dampener device(s) may be an orifice with a resistance, coupled with a fluid volume.

In some embodiments, the fluid delivery system includes a system pulsation dampener coupled between a standpipe manifold and a standpipe is provided. The system includes a fluid reservoir, a fluid pump, a manifold, a system pulsation dampener, and piping. The fluid reservoir stores a fluid used for a drilling procedure. The fluid pump pumps the fluid from the fluid reservoir through the fluid delivery system. The manifold is located downstream from the fluid pump, and receives and combines fluids from the one or more fluid pumps. The system pulsation dampener receives the combined fluid from the manifold, and dampens residual pulsations from the manifold. The piping receives fluid output from the system pulsation dampener, and transfers the fluid received from the system pulsation dampener further downstream.

In other embodiments, the fluid delivery system includes a system pulsation dampener coupled after the fittings combining multiple flows of fluid streams into a single stream is provided. The system includes fittings combining multiple fluid flow streams into a single flow stream, a system pulsation dampener, and piping. The fluid pump pumps the fluid from the fluid reservoir through the fluid delivery system. The fluid flow stream is combined using fittings located downstream from the fluid pump, which collectively receive and combine fluids from the one or more fluid pumps. The system pulsation dampener receives the combined fluid flow stream, and dampens residual pulsations. The piping receives fluid output from the system pulsation dampener, and transfers the fluid received from the system pulsation dampener further downstream.

In still other embodiments, the fluid delivery system includes one or more system pulsation dampeners in the fluid flow path within and/or after the standpipe or after the fittings combining fluid flow streams, and in some embodiments as close to the top drive or swivel of the drilling rig as possible, such as on the top drive or swivel or in or connected to the entry pipe for the top drive or swivel. These one or more system pulsation dampeners typically act as supplementary pulsation dampening devices, in addition to a main pulsation dampener at the outlet of the mud pump and/or a pulsation dampener between the standpipe manifold and the standpipe or after the fittings combining fluid flow streams. The system may therefore include some combination of: (a) a main pulsation dampener at the outlet of the mud pump; (b) a pulsation dampener between the standpipe manifold and the standpipe or after the fittings combining fluid flow streams; and (c) in embodiments with a standpipe and standpipe manifold, one or more pulsation dampeners in the fluid flow path within and/or after the standpipe.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 is a high level flowchart of a fluid delivery and pulsation dampening process of a fluid delivery system according to various embodiments of the present disclosure.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged standpipe manifold dampener or system dampener that can be used to control or partially control pulsation amplitudes.

Reciprocating systems, such as reciprocating pump systems and similar equipment, operate in many types of cyclic hydraulic applications. For example, reciprocating mud pump systems are used to circulate the mud or drilling fluid on a drilling rig. Pressure peaks within the pumped fluid accelerate, with each pulsation, the deterioration of the pump, the pump's fluid end expendable parts, and equipment downstream from the pump, such as measurement equipment used to determine drilling parameters, and washpipe and washpipe packing. Failure to control such pressure peaks inevitably affect the operating performance and operational life of the pump, pump fluid end expendable parts and all upstream or downstream components. Pressure peaks may also interfere with instrument signal detection, such that failure to control pressure peaks may also affect the signal detection and/or quality of the signal detection in (for example) measurement while drilling operations.

Pulsation control equipment is typically placed immediately upstream or downstream from a reciprocating pump, often with a relative size and configuration proportional to the volume of desired fluid displacement per stroke of the pump and the maximum allotted magnitude of the pressure peaks that may be experienced by the pump system during each pulsation. Pulsation control equipment thus aids in reducing pump loads and minimizing pulsation amplitudes to the pump, the pump's fluid end expendable parts and to equipment upstream or downstream. As a result, pulsation control equipment increases the relative operating performance and life of the pump, the pump's fluid end expendable parts and any equipment upstream or downstream from the pump.

However, pulsations may be experienced further downstream from the mud pumps as well, as fluid travels through piping towards the intended destination. These pulsations may be exacerbated when the fluid need to be diverted down a different path, or when multiple streams of fluid need to be combined and redirected into a single stream. Most systems do not account for these downstream pulsations. These downstream pulsations can cause damage to downstream components and increased noise for downstream measurement instruments and sensors.

Figure 1:
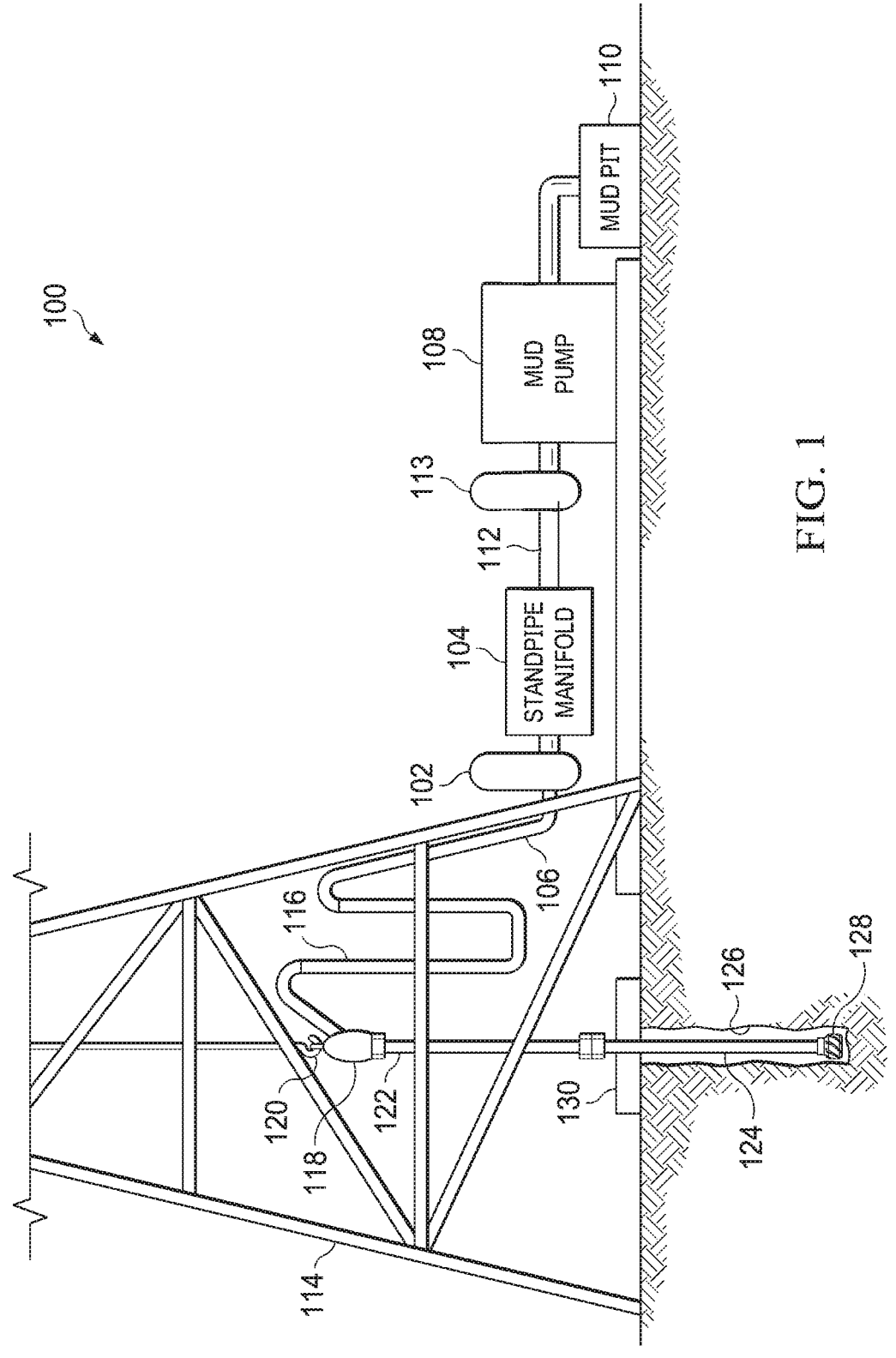
FIG. 1 illustrates a diagrammatic view of a drilling system including a pulsation dampener installed between a standpipe manifold and a standpipe according to various embodiments of the present disclosure.
Figure 2:
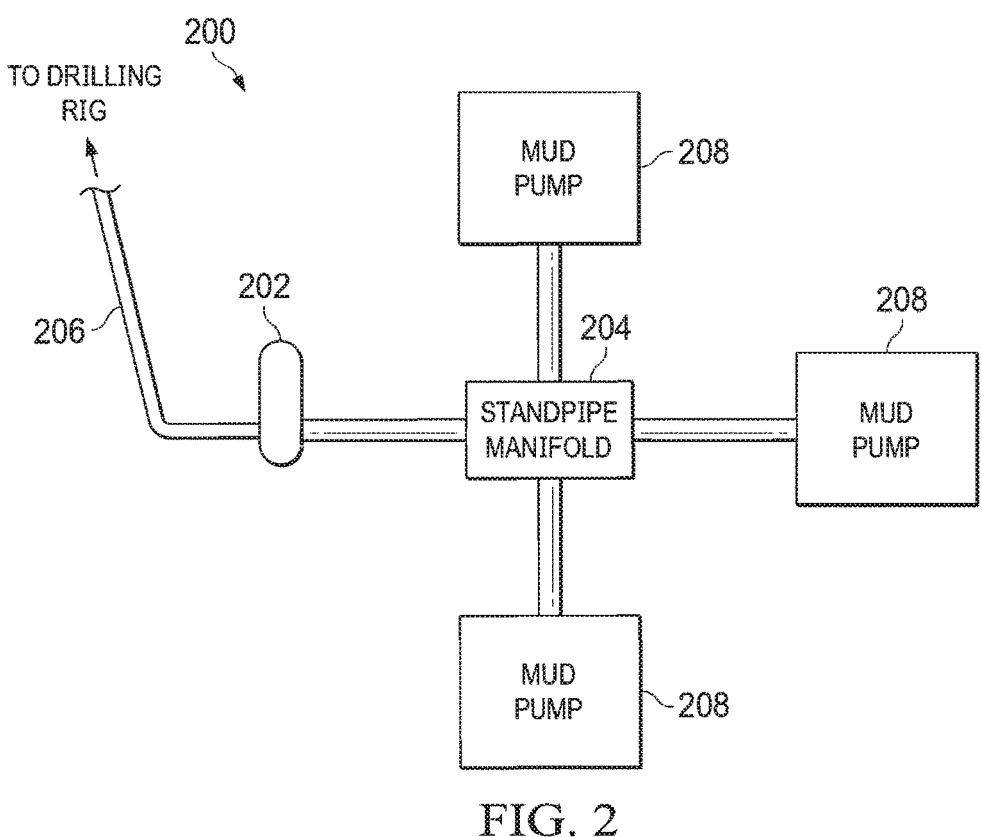
FIG. 2 illustrates a diagrammatic view of a portion of a system for fluid delivery, drilling, or both that includes a plurality of mud pumps according to various embodiments of the present disclosure, which may be used in embodiments of a drilling system that include a system pulsation dampener installed between a standpipe manifold and a standpipe as depicted in FIG. 1.
Figure 3:
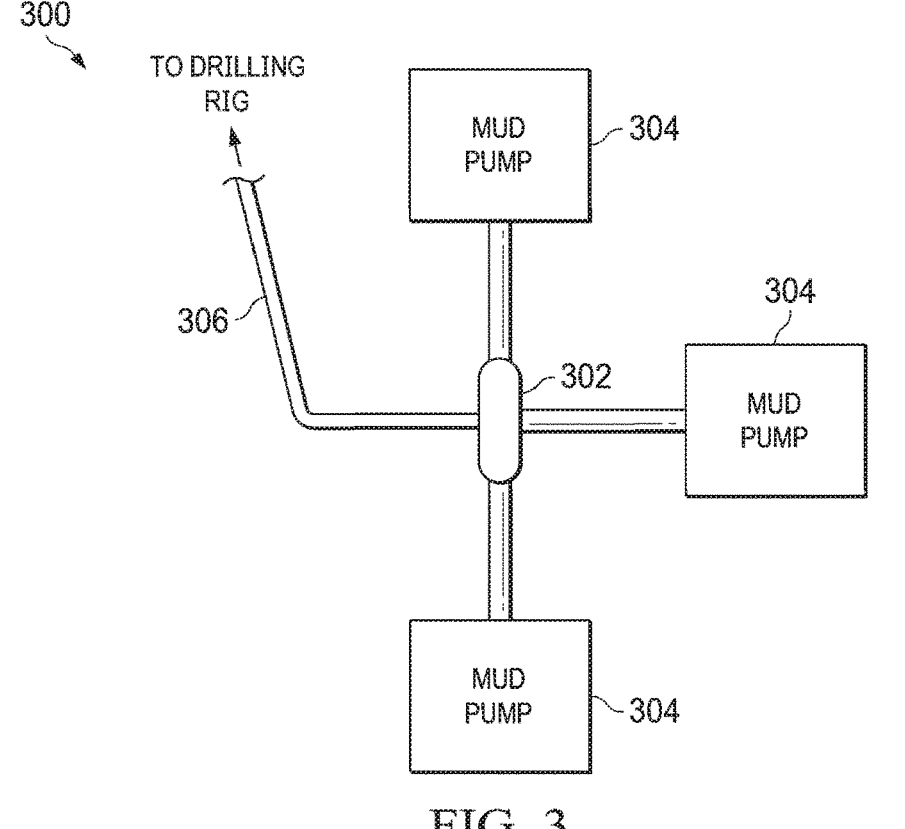
FIG. 3 illustrates a diagrammatic view of a portion of a system fluid delivery, drilling, or both including a combination standpipe manifold and pulsation dampener in one system device, the standpipe manifold system dampener according to various embodiments of the present disclosure, which may also be used in embodiments of a drilling system that include a system pulsation dampener installed between the mud pump(s) and a standpipe as depicted in FIG. 1.
Figure 4:
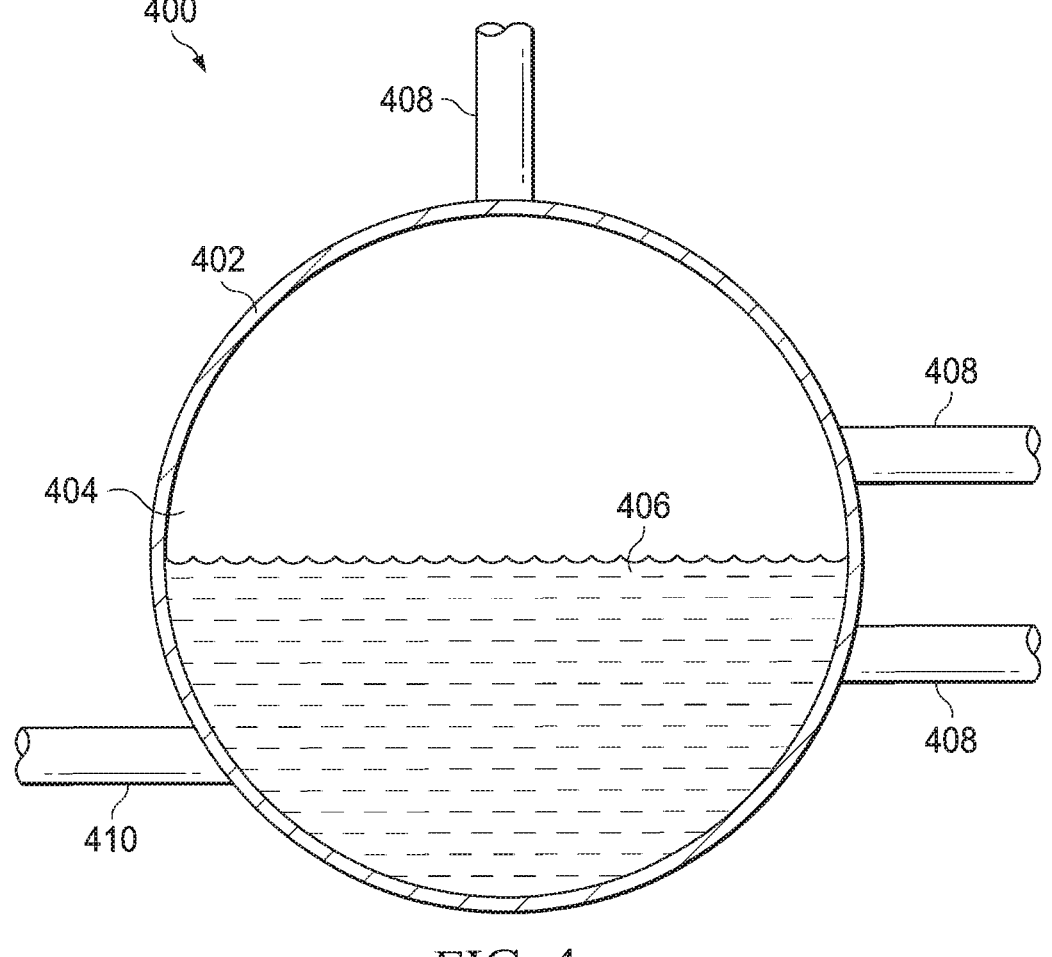
FIG. 4 illustrates one combination standpipe manifold and system pulsation dampener according to various embodiments of the present disclosure.
Figure 5:
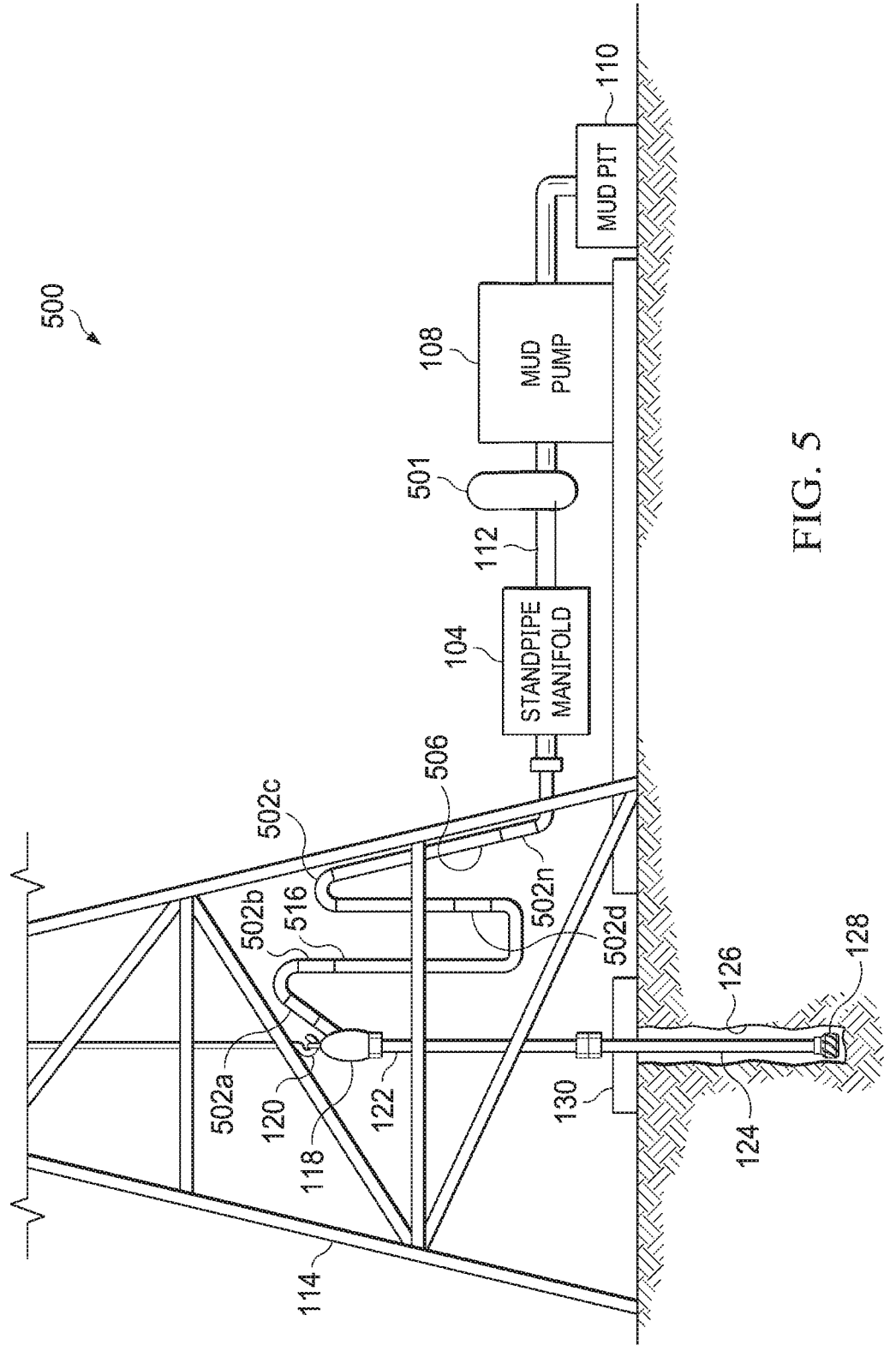
FIG. 5 is a diagrammatic view of a drilling system including an alternative pulsation dampener mechanism that may be installed in, proximate to, or downstream of a standpipe according to various embodiments of the present disclosure.
Figure 6A:
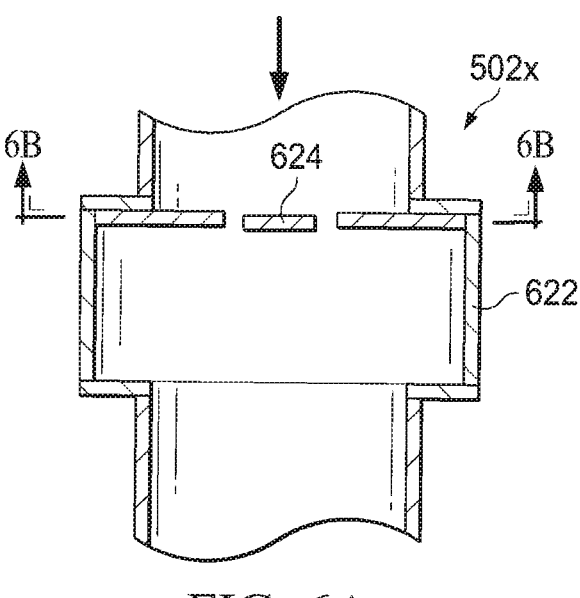
FIGS. 6A through 6E are enlarged diagrammatic views of various designs for system pulsation dampener device(s) implementing the pulsation dampening orifice assembly portion(s) of FIG. 5, used as system pulsation dampening device(s)
Figure 6B:
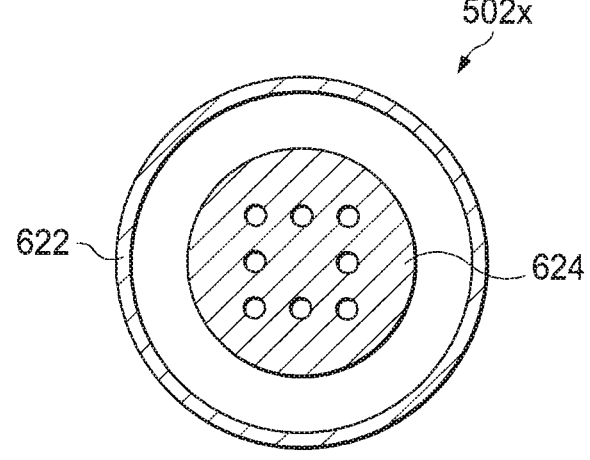
Figure 6C:
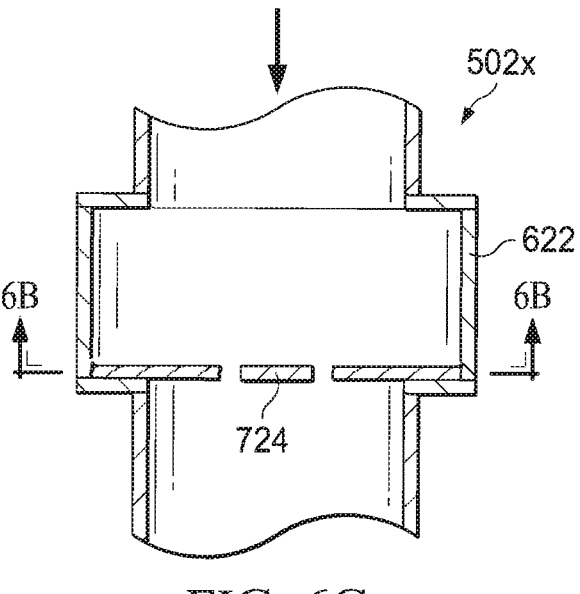
Figure 6D:
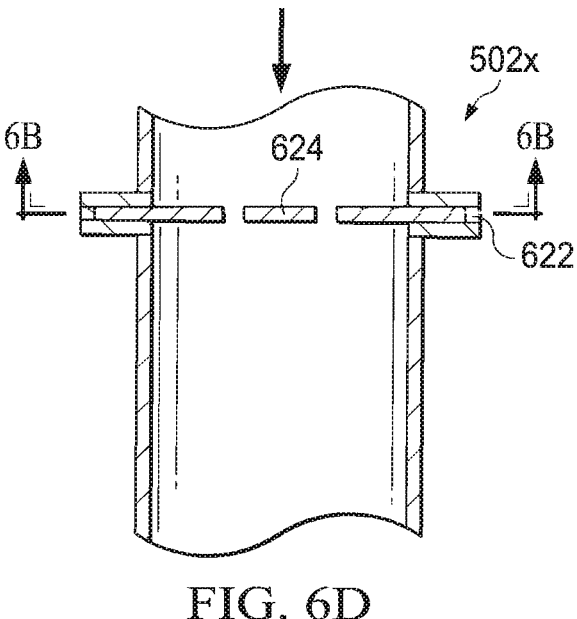
Figure 6E:
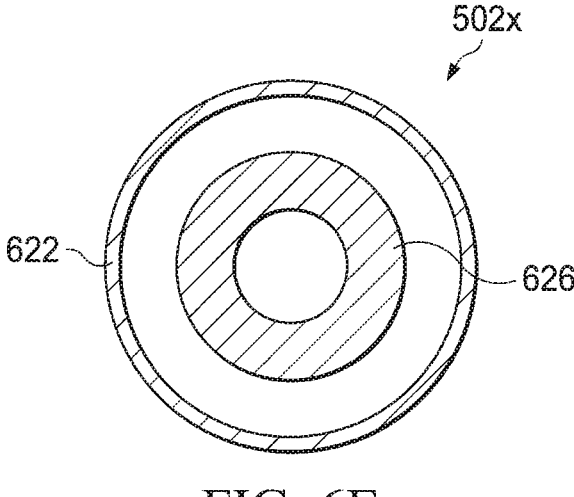
Figure 7:
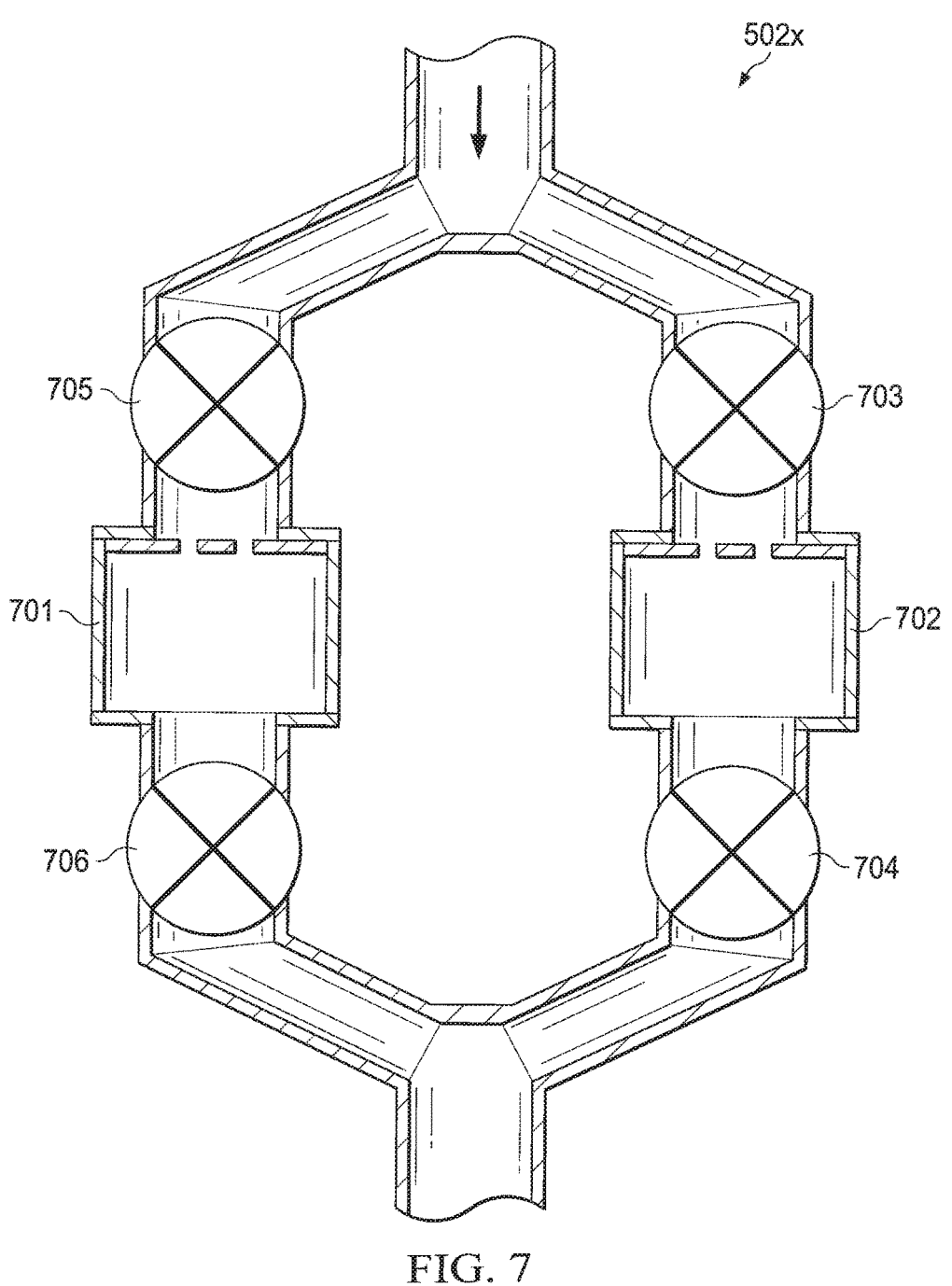
FIG. 7 is a diagrammatic view of an alternate design, with redundancy, for system pulsation dampener device(s) that may be installed in, proximate to, or downstream of a standpipe according to various embodiments of the present disclosure to implement the pulsation dampening orifice assembly portion(s) of FIG. 5.
Figure 8:
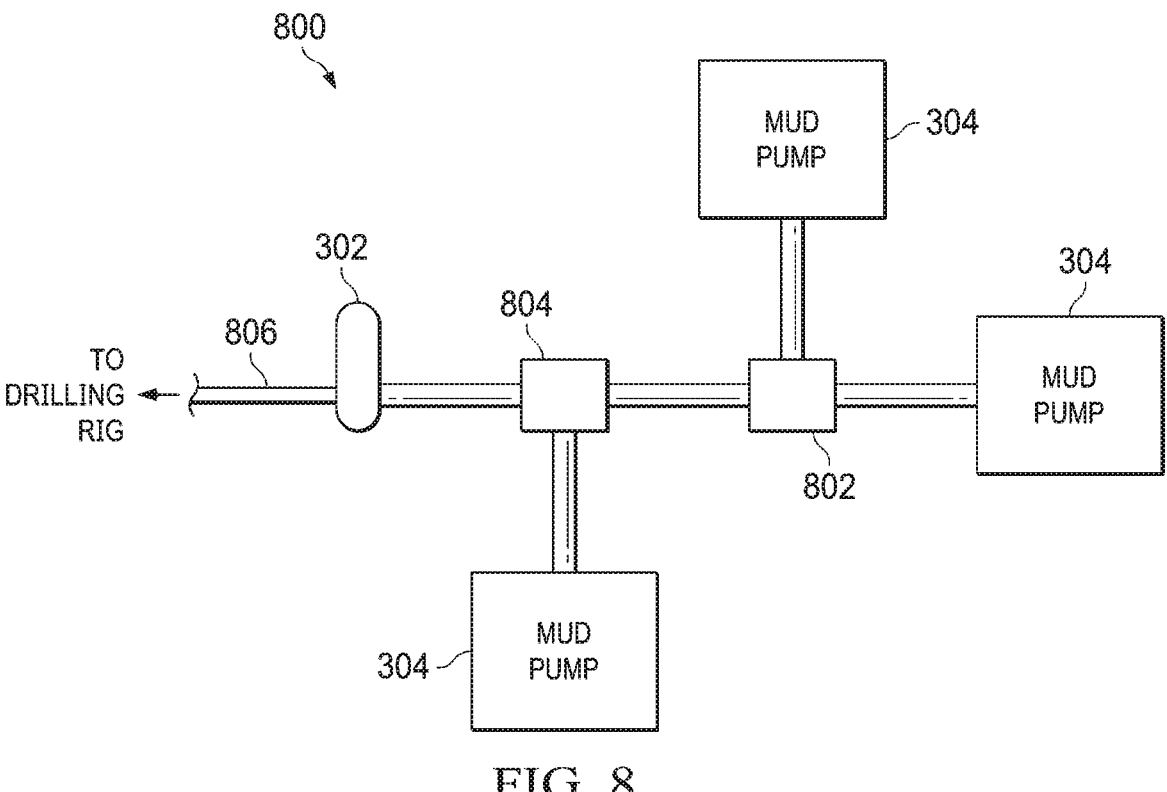
FIG. 8 illustrates a diagrammatic view of a fluid delivery or drilling system including fittings combining multiple fluid flow streams according to various embodiments of the present disclosure, which may also be used in embodiments of a drilling system that include a system pulsation dampener installed after the fittings combining multiple fluid flow streams.

As used herein, "system pulsation dampener" refers to a pulsation dampener installed between a standpipe manifold and a standpipe as illustrated by FIGS. 1 and 2, a combination standpipe manifold and pulsation dampener device as illustrated by FIG. 3, a pulse dampener manifold illustrated by FIG. 4, the orifice assembly pulsation dampening device(s) illustrated in FIGS. 5, 6 and 7, and the system pulsation control dampener located after the location at which outputs from multiple pumps are consolidated into one flow stream as shown in FIG. 8.

FIG. 1 illustrates a diagrammatic view of a drilling system 100 including a pulsation dampener 102 installed between a standpipe manifold 104 and a standpipe 106 according to various embodiments of the present disclosure. The embodiment of the drilling system 100 illustrated in FIG. 1 is for illustration only. FIG. 1 does not limit the scope of this disclosure to any particular implementation of a drilling system.

Referring now to FIG. 1, the drilling system 100 includes at least one pulsation dampener 102, at least one standpipe manifold 104, at least one standpipe 106, at least one mud pump 108, at least one mud pit 110, at least one discharge line 112, a conventionally located pulsation dampener 113 at the outlet of the mud pump 108, and at least one drilling rig 114. The drilling system 100 operates to pump mud or other fluids down a well currently being drilled to keep a drill bit 128 from overheating, provide lubrication to the drill bit, and remove rock cuttings to the surface.

A fluid pump or mud pump 108 may pump fluid or mud from a mud pit 110 through a discharge line 112 in the direction of a drilling rig 114. More than one mud pump 108 can be utilized in a drilling system 100 to continue drilling upon the failure of a single mud pump 108. A pulsation dampener 102 can also be installed on the discharge line 112 for each mud pump 108 to further reduce pulsations. The mud pit 110 can also reference a fluid reservoir, where the fluid reservoir stores a fluid used during a drilling process.

Conventionally, a pulsation dampener 113 is located along the discharge line 112, at the outlet of the mud pump 108 and before the standpipe manifold 104. The standpipe manifold 104 may be installed down the discharge line 112 and is attached to and/or coupled in fluid communication with the drilling rig 114. The standpipe manifold 104 may receive a plurality of different fluid streams from a plurality of mud pumps 108. The standpipe manifold 104 may then combine all of the fluid streams together to send a single fluid stream up the standpipe 106. Other functions tradition-ally performed by the standpipe manifold are to provide an auxiliary connection for a supplementary pump and, in systems with multiple standpipes providing operational redundancy in case of failure of one standpipe, to switch fluid flow paths from one standpipe to another. However, those skilled in the art understand that some systems dis-pense with the standpipe manifold, and simply bring the outlet flows of multiple mud pumps together in a single line somewhere near the mud pumps or downstream, with the combined flow then traveling in a single line to the sub-structure and upwards toward the standpipe, When the fluid streams from multiple mud pumps are combined (in a standpipe manifold or without one), the pulsations in the resulting combined fluid flow can be enlarged based on the different pulsations of the mud pumps 108 being used. For example, the different types or sizes of mud pumps 108 can be used in a single drilling system 100, which would cause variations or pulsations in the fluid flow through the pipe. The mud pumps 108 could also be located at different distances from the standpipe manifold 104. The mud pumps 108 could begin at different times, operating off cycle from other mud pumps 108, or simply be operating at different stroke lengths. Any of the previous operating parameters would affect the flow of fluids or mud into the standpipe manifold 104 causing pulsations at the well.

The standpipe 106 may be installed on the drilling rig 114 and travel up the drilling rig 114 to provide the fluid stream through a rotary hose 116 connected to a swivel 118, the swivel 118 coupled to a rotary hook 120. The standpipe 106 receives discharge from the standpipe manifold, which includes the system pulsation dampener 102. The standpipe manifold 104 can include multiple discharges to the stand-pipe 106 in case of failure in part of the standpipe manifold 104 or associated pipeline.

The swivel 118 may serve as a passageway for the fluid stream into a kelly drive 122 (or just "kelly"). The kelly 122 connects to a drill string 124. The fluid passes through the kelly 122 and the drill string 124 down a bore hole 126 to a drill bit 128 disposed at a far end of the drill string 124. The kelly 122 is typically rotated by a rotary table 130. More recent systems may include a top drive to rotate the drill string 124 as an alternative to the rotary table and kelly drive, and the present disclosure is applicable to such top drive configurations as well.

In drilling systems, pulsation dampeners 113 can be installed near the mud pump 108 to reduce pump loads and minimize pulsation amplitudes from the mud pumps 108. However, as fluid is combined at the standpipe manifold 104 into a single stream and sent to the standpipe 106, significant energy and pulsation amplitudes may be created by the combining of the streams from the mud pumps 108 or transferred directly to the standpipe 106, which is then transferred to the rest of the system downstream described herein. The pulsation amplitudes produced may be greater as more mud pumps 108 are used to provide fluid reaching the standpipe manifold 104, as pulsations from multiple pipes receiving fluid from multiple mud pumps 108 come together and accumulate at the standpipe manifold, which are then transferred to the standpipe 106. These pulsations can cause wear and damage to components, including the connections near the swivel 118, kelly 122, and other components such as a wash pipe and wash pipe packing (seals) (both not shown) that serves as a conduit for fluid through the swivel 118. Instruments used for monitoring and measuring opera-tions while drilling can also be affected by the residual pulsations from the mud pump 108. Even the smallest pulsations from the standpipe manifold can affect the mea-surement readings.

An additional, system pulsation dampener 102 is thus installed between the standpipe manifold 104 and the stand-pipe 106 to reduce residual pulsations from the mud pump 108 and to reduce pulsations from combining of fluid streams at the standpipe manifold 104. System pulsation dampener 102 reduces the pulsations and, like the conven-tional pulsation dampener 113 and all other system pulsation dampener device(s) described herein, may produce an inter-nal or external pressure drop within the passing fluid in order to further reduced higher frequency pulsations and enhance the overall dampening performance. In some embodiments, the system pulsation dampener 102 may be a gas charged dampener. The system pulsation dampener 102, like the conventional pulsation dampener 113 and all other system pulsation dampener device(s) described herein, may a hydro-pneumatic or gas-charged pressure vessel containing compressed air or nitrogen and a bladder (or bellows) that separates the process fluid from the gas charge. In some embodiments, the system pulsation dampener 102, like the conventional pulsation dampener 113 and all other system pulsation dampener device(s) described herein, may be a ball-type or cylindrical-type flow-through dampener. In some embodiments, reactive dampeners may be used that rely on compressibility of the process fluid contained within dampener enclosure and a resistance device fitted with or into the pulsation dampener to dampen pump pulsations.

The system pulsation dampener 102 may be installed to the standpipe manifold 104 via a hose connection. The system pulsation dampener 102 may have a flanged outlet connection, and a flange to hammer union adapter may be used to connect the pulsation dampener 102 to the standpipe manifold 104. The system pulsation dampener 102 may also connect to the standpipe 106 via a hosed connection.

The system pulsations dampener 102 installed before the standpipe 106 reduces both low and high frequency pulsa-tion magnitudes to allow the wash pipe and packing, as well as other component, to last longer. In addition, the system pulsation dampener 102 reduces noise and pulsation levels to allow for easier signal detection by the Measurements While Drilling (MWD) and Logging While Drilling (LWD) contractor located on the drilling rig 114. The system pulsation dampener 102 also assists with reduced interfer-ence with downhole instruments that may pick up the residual pulsations and that skew detections and generated data from the downhole instruments.

FIG. 2 illustrates a diagrammatic view of a fluid delivery or drilling system 200 including a plurality of mud pumps 208 according to various embodiments of the present dis-closure, which may be used in embodiments of a drilling system 100 that include a system pulsation dampener 102 installed between a standpipe manifold 104 and a standpipe 106 as depicted in FIG. 1. That is, except for replacement of the components in FIG. 1 with their counterparts, depicted in FIG. 2, the remainder of the drilling system for embodi-ments in accordance with FIG. 2 may conform to the additional structures depicted in FIG. 1. The embodiment of the drilling system 200 illustrated in FIG. 2 is for illustration only. FIG. 2 does not limit the scope of this disclosure to any particular implementation of a drilling system.

Referring now to FIG. 2, the drilling and/or fluid delivery system portion 200 for fluid delivery, drilling, or both that includes at least one system pulsation dampener 202, at least one standpipe manifold 204, at least one standpipe 206, and a plurality of mud pumps 208. The components of drilling system portion 200 can be used in place of the similar components of drilling system 100 illustrated in FIG. 1.

A system pulsation dampener 202 is installed between a standpipe manifold 204 and a standpipe 206. A plurality of mud pumps 208 may transfer fluid to a standpipe manifold 204 simultaneously, creating vibrations at the standpipe manifold 204. The pulsation dampener 202 may be installed in a similar manner as that described herein with respect to pulsation dampener 102, serving to alleviate pulsations generated by the plurality of mud pumps 208 as fluid enters and intersects within the standpipe manifold 204 and is combined into a single outlet stream.

FIG. 3 illustrates a diagrammatic view of a portion 300 of a system for fluid delivery, drilling, or both including a combination standpipe manifold and pulsation dampener device 302 according to various embodiments of the present disclosure, which may also be used in embodiments of a drilling system 100 that include a pulsation dampener 102 installed between the mud pump(s) and a standpipe as depicted in FIG. 1. That is, except for replacement of the components in FIG. 1 with their counterparts, depicted in FIG. 3, the remainder of the drilling system for embodiments in accordance with FIG. 3 may conform to the additional structures depicted in FIG. 1. The embodiment of the drilling system 300 illustrated in FIG. 3 is for illustration only. FIG. 3 does not limit the scope of this disclosure to any particular implementation of a drilling system.

Referring now to FIG. 3, the drilling and/or fluid delivery system portion 300 includes at least one combination standpipe manifold and pulsation dampener device 302, a plurality of mud pumps 304, at least one standpipe 306.

Standpipe manifolds may increase pulsations experienced by a drilling system due to standpipe manifolds typically having connections or piping that receives fluid from multiple directions from different mud pumps. Standpipe manifolds often have angled turns that each fluid stream must travel through before the standpipe manifold combines the disparate streams into a single stream. As the fluid enters the manifold and is transferred through the turns of the standpipe manifold, additional vibrations may be created.

The combination standpipe manifold and pulsation dampener device 302 can be used instead of a standpipe manifold. Instead of diverting the separate fluid streams into a single stream with hard turns, the fluids can be received and manipulated within the body of the combination standpipe manifold and pulsation dampener device 302. Pulsation dampeners often have a volume of space, or reservoir, within the dampener where a certain amount of fluid may accumulate and pulsations are reduced before moving out of the pulsation dampener. The combination standpipe manifold and pulsation dampener device 302 may receive separate fluid streams from a plurality of mud pumps 304. The combination standpipe manifold and pulsation dampener device 302 may have piping mounted on the exterior of surface of the combination standpipe manifold and pulsation dampener device 302. In the case of a ball-type or cylindrical-type pulsation dampener, the piping may be mounted at select place on the spherical or cylindrical body of the pulsation dampener. Fluid received by the combination standpipe manifold and pulsation dampener device 302 may be deposited into the interior volume of the combination standpipe manifold and pulsation dampener device 302 and fluid within the interior volume of the combination standpipe manifold and pulsation dampener device 302 would exit the combination standpipe manifold and pulsation dampener device 302 to travel to the standpipe 306. The combination standpipe manifold and pulsation dampener device 302 can align the different received fluids to control the pulsations to be reduced in the combination, such as by creating a rotation within a chamber.

Since the combination standpipe manifold and pulsation dampener device 302 includes an interior volume, the problems of using a standpipe manifold can be avoided. The combination standpipe manifold and pulsation dampener device 302 does not have turns like a standpipe manifold, reducing the vibrations created as the separate streams intersect, and the combination standpipe manifold and pulsation dampener device 302 also provides pulsation dampening effects as it receives the separate fluid streams. The separate fluid streams can thus be combined within the volume of the combination standpipe manifold and pulsation dampener device 302 and then the single combined stream may exit the combination standpipe manifold and system pulsation dampener device 302 to travel to the standpipe 306 with a reduced or minimal energy being transferred to the standpipe 306 and to the rest of the downstream components.

FIG. 4 illustrates a combination standpipe manifold and pulsation dampener device 400 according to various embodiments of the present disclosure, which may be used in embodiments of a drilling system 100 that include a pulsation dampener 102 installed between the mud pump(s) and a standpipe as depicted in FIGS. 1 through 3 or in embodiments of a drilling system 100 that include a pulsation dampener 302 installed after fittings combining multiple fluid flow streams as depicted in FIG. 8. The embodiment of the combination standpipe manifold and pulsation dampener device 400 illustrated in FIG. 4 is for illustration only. FIG. 4 does not limit the scope of this disclosure to any particular implementation of a pulsation dampener or pulsation dampening method.

Referring now to FIG. 4, the combination standpipe manifold and pulsation dampener device 400 may be used in the systems 100, 200, and 300 described herein. The pulse dampener manifold includes a body 402. The body 402 illustrated in FIG. 4 is a spherical or cylindrical body according to various pulse dampeners having a ball-type or cylindrical-type body. However, different body shapes may be used to allow for different pulsation dampener body shapes, such as that shown in FIGS. 1-3.

The pulsation dampener manifold 400 may also include a reservoir 404 within an interior of the body 402. The reservoir 404 may collect a volume of fluid 406 from mud or fluid pumps residing upstream, through a plurality of upstream connections 408, in a fluid delivery or drilling system, such as those described with respect to FIGS. 1-3. The fluid received from each of the upstream connections 408 are combined as the volume of fluid 406. At least a portion of the volume of fluid 406 may then exit the pulse dampener manifold 400 as single fluid stream through a downstream connection 410. The combination standpipe manifold and pulsation dampener device 400 thus may fully replace a standpipe manifold, reducing the vibrations created from multiple fluid streams traveling through a standpipe manifold, and providing pulsation dampening for all streams entering the combination standpipe manifold and pulsation dampener device 400.

FIG. 5 is a diagrammatic view of a drilling system including an alternative system pulsation dampener mechanism(s) that may be installed in, proximate to, or downstream of a standpipe according to various embodiments of the present disclosure. The embodiment of the drilling system 500 illustrated in FIG. 5 is for illustration only. FIG. 5 does not limit the scope of this disclosure to any particular implementation of a drilling system. Although FIG. 5 does not depict a conventional pulsation dampener located at the output of the mud pump(s) or a system pulsation dampener between the standpipe manifold and the standpipe, those skilled in the art will recognize that one or more of the system pulsation dampener(s) diagrammatically depicted in FIG. 5 may be used either without such pulsation dampeners, with either of the conventional or system pulsation dampeners described above, or with both such conventional and system pulsation dampeners.

In the system of FIG. 5, pulsation dampening is either provided or enhanced by one of several different types of orifice designs positioned at one or multiple locations in or near the standpipe 506 or in the fluid flow path after the standpipe. The one or more orifice assemblies 502a, 502b, 502c, 502d, . . . , 502n that each comprises system pulsation dampening device(s) may be located at different points within the fluid flow path. The pulsation dampening orifice assembly may be located within or connected to the entry pipe for the top drive or swivel (depending on the type used by any given rig) as illustrated by orifice assembly 502a. The pulsation dampening orifice assembly may be located in between the hose 516 and the end of the entry pipe for the top drive or swivel as illustrated by orifice assembly 502b. The pulsation dampening orifice assembly may be located at a point just past the standpipe 506, in between the end of the standpipe 506 and the beginning of the hose 516 that connects the standpipe 506 to the top drive or swivel (depending on the type used by any given rig) as illustrated by orifice assembly 502c. Alternatively, the pulsation dampening orifice assembly may be located further along the hose/piping system, as illustrated by orifice assembly 502d. In still another alternative, the pulsation dampening orifice assembly may also be located in the standpipe 506 located on the side of the derrick, possibly at or near one end of the standpipe 506 (although it may be positioned anywhere along the length of the standpipe 506), as illustrated by orifice assembly 502n. A single pulsation dampening orifice assembly may be employed, or multiple pulsation dampening orifice assemblies may be used at different locations along the fluid flow path, including one in each of the locations depicted in FIG. 5 or multiple pulsation dampening orifice assemblies within the top drive or swivel entry pipe (in the region of orifice assembly 502a), between the hose and the top drive or swivel entry pipe (in the region of orifice assembly 502b), between the standpipe 506 and the hose 516 (in the region of orifice assembly 502c), multiple pulsation dampening orifice assemblies in the hose 516 (in the region of orifice assembly 502d), and/or multiple pulsation dampening orifice assemblies in the standpipe 506 (in the region of orifice assembly 502n). Those skilled in the art will recognize that various permutations of the number and location of pulsation dampening orifice assemblies may be suited to different applications. Pulsation dampening orifice assemblies may also be positioned at other locations than those shown in FIG. 5, such as at the end (outlet) of the standpipe or at the connection to the swivel or top drive for the hose connected to the standpipe. As noted above, each pulsation dampening orifice assembly may produce an internal or external pressure drop in fluid passed, to enhance dampening of higher frequency pulsations. These orifice assemblies may or may not include liquid volumes to further enhance performance.

FIGS. 6A through 6E are side sectional and cross sectional views, respectively, of a pulsation dampening orifice assembly 502x that may be used as any one of orifice assemblies 502a, 502b, 502c, 502d, and/or 502n to implement one or more system pulsation dampening device(s). As illustrated in FIG. 6A, one exemplary pulsation dampening orifice assembly 502x includes a small enlarged volume, which may be formed (for example) by inserting a pipe segment 6722 having a larger inner diameter (as little as 1-2 inches larger) that the pipe for the fluid flow path before and after the pulsation dampening orifice assembly. At the end of the enlarged volume is a fluid flow resistance or pressure drop feature such as an orifice plate or a drop tube. In the example depicted in FIGS. 6A and 6B, an orifice plate 624 or 626 (see FIG. 6E) is provided. However, those skilled in the art will recognize that a drop tube may be used instead. In accordance with the known art, the aggregate area of the openings through the orifice plate 624 or 626 is selected, in combination with the enlarged volume, to dampen pulsations within the fluid flow through the standpipe 506 and hose 516. As shown in FIG. 6C, the orifice plate 624 or 626 may be located at the opposite end (relative to the direction of fluid flow) of the enlarged volume formed by the pipe segment 622. Alternatively, the orifice plate 624 or 626 may be located in the middle of the enlarged volume, or anywhere in between. Multiple orifice plates may be disposed within a single enlarged volume. As illustrated in FIG. 6D, in a simple form, the pulsation dampening orifice assembly 502x simply comprises an orifice plate 6724 or 626 without any fluid-flow resistance produced by an adjoining or surrounding enlarged volume of the fluid flow path. As illustrated in FIG. 6D, the orifice plate 624 may have a plurality of orifices. As illustrated in FIG. 6E, the pulsation dampening orifice assembly 502x may comprise an orifice plate 626 with a single orifice. As noted above, orifice assemblies may or may not include liquid volumes to further enhance performance. FIGS. 6A and 6C show an expanded section 622 within which a liquid volume may be contained.

FIG. 7 is a diagrammatic view of an alternate design, with redundancy, for system pulsation dampener device(s) that may be installed in, proximate to, or downstream of a standpipe according to various embodiments of the present disclosure to implement the pulsation dampening orifice assembly portion(s) of FIG. 5. In the embodiment of FIG. 7, a pulsation dampening orifice assembly 502x includes a first assembly 701 and a second assembly 702 each including an enlarged volume and orifice plate, which are provided within each of two parallel fluid flow paths with control valves 703, 704, 705 and 706 (manually controlled, or under automated control) controlling which of the two flow paths is being used. This design provides redundancy in case of failure of a pulsation dampening orifice assembly, and in some high flow applications may be used as a low flow device.

FIG. 8 illustrates a diagrammatic view of a fluid delivery or drilling system 800 including fittings combining multiple fluid flow streams according to various embodiments of the present disclosure, which may also be used in embodiments of a drilling system 100 that include a pulsation dampener 102 installed after the fittings combining multiple fluid flow streams. The embodiment of the drilling system 800 illustrated in FIG. 8 is for illustration only. FIG. 8 does not limit the scope of this disclosure to any particular implementation of a drilling system.

There is not always a standpipe manifold within the fluid flow streams of a drilling rig. Some rigs bring the various mud pump discharge fluid streams together by simple fittings that join multiple fluid streams together into one stream. Referring now to FIG. 8, the drilling system 800 includes at least one fitting 802 and/or 804, a plurality of mud pumps 304, and piping 806 receiving the combined fluid flow streams.

The system pulsation dampener device 102, 202, 302, 402 or 502x (system pulsation dampener device 302 depicted in FIG. 6) can be used within piping 806 after the fittings 802 and/or 804. Pulsation dampeners such as system pulsation dampener device 102, 202, 302, 402 or 502x often have a volume of space, or reservoir, within the dampener where a certain amount of fluid may accumulate and pulsations are reduced before moving out of the pulsation dampener. The system pulsation dampener device 102, 202, 302, 402 or 502x may receive the combined mud pump discharge fluid streams. The fluid received by the system pulsation dampener device 102, 202, 302, 402 or 502x may be deposited into the interior volume of the pulsation dampener 102 or 202, combination standpipe manifold and pulsation dampener device 302, a pulsation dampener manifold 400, or orifice assembly pulsation dampener device(s) 502x. Fluid within the interior volume of the system pulsation dampener device would exit the system pulsation dampener device to travel to the drilling rig 114 via piping 806. The system pulsation dampener device can control the pulsations to be reduced in the combination, such as by creating a rotation within a chamber.

Since the system pulsation dampener device includes an interior volume, the problems of using a standpipe manifold can be avoided. The system pulsation dampener device does not have turns like a standpipe manifold, reducing the vibrations created as the separate streams intersect, and the system pulsation dampener device also provides pulsation dampening effects as it receives the combined fluid streams. The combined fluid streams may thus exit the system pulsation dampener device to travel to the drilling rig 114 with reduced or minimal energy being transferred to the rest of the downstream components.

FIG. 9 illustrates a flowchart of a fluid delivery and pulsation dampening process 900 of a fluid delivery system 100 or 500 according to various embodiments of the present disclosure. For example, the process 900 of FIG. 9 may be performed by a system 100 illustrated in FIG. 1 or a system 500 illustrated in FIG. 5, or those systems as modified according to FIG. 2, 3 or 4 (without, as appropriate, the steps relating to a manifold).

Referring now to FIG. 9, the process begins at step 902. At step 902, one or more pumps receive fluid from one or more fluid reservoirs, such as the mud pit 110 described herein. At step 904, the one or more fluid pumps send one or more streams of fluid downstream through the fluid delivery system. At step 906, a manifold receives the one or more streams of fluid and combines the one or more streams of fluid into a single stream of fluid. At step 908, the pulsation dampener receives the single stream of fluid from the manifold.

At step 910, the installed system pulsation dampener dampens the residual pulsations produced by the manifold. In some embodiments, the system pulsation dampener may perform the dampening operations when the one or more streams are received at the pulsation dampener, such as if the pulsation dampener is a combination standpipe manifold and pulsation dampener device replacing a standpipe manifold in the fluid delivery system. At step 912, piping receives fluid output from the system pulsation dampener. The piping may in some embodiments be a standpipe, such as the standpipe 106. At step 914, the piping transfers the fluid downstream. At step 916, one or more additional installed system pulsation dampener(s) dampen any residual pulsations within the fluid flow.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A fluid delivery system, comprising:
   at least one fluid pump configured to pump fluid through a borehole fluid delivery system;
   a standpipe configured to receive, at a first end of the standpipe, the pumped fluid from the at least one fluid pump;
   one of a top drive or a swivel coupled between the standpipe and borehole piping within a borehole;
   an entry pipe or hose for the one of the top drive or the swivel coupled to a second end of the standpipe and configured to receive the pumped fluid exiting the standpipe; and
   a system pulsation dampener connected within the entry pipe or hose and configured to dampen pulsations within the pumped fluid received from the standpipe, to facilitate signal detection for one of measurement while drilling (MWD) or logging while drilling (LWD) operations.

2. The fluid delivery system of claim 1, further comprising:
   a standpipe manifold located downstream from the at least one fluid pump and configured to receive the pumped fluid from the at least one fluid pump; and
   a system pulsation dampener disposed within the standpipe.

3. The fluid delivery system of claim 2, wherein the standpipe manifold is configured to combine the pumped fluid from the at least one fluid pump with fluid from another fluid pump.

4. The fluid delivery system of claim 3, wherein the standpipe manifold is configured to output a single combined fluid including the pumped fluid from the at least one fluid pump and the fluid from the other fluid pump.

5. The fluid delivery system of claim 1, further comprising an additional pulsation dampener at an outlet of the at least one fluid pump.

6. A fluid delivery system, comprising:
   at least one fluid pump configured to pump fluid through a borehole fluid delivery system;
   a standpipe configured to receive, at a first end of the standpipe, the pumped fluid from the at least one fluid pump;
   one of a top drive or a swivel coupled between the standpipe and borehole piping within a borehole;
   an entry pipe or hose for the one of the top drive or the swivel coupled to a second end of the standpipe and configured to receive the pumped fluid exiting the standpipe and transfer the received, pumped fluid to the one of the top drive or the swivel; and
   two or more system pulsation dampeners configured to dampen pulsations within the fluid transferred to the one of the top drive or the swivel, wherein the two or more system pulsation dampeners comprise:

a first of the two or more system pulsation dampeners in the entry pipe or hose for the one of the top drive or the swivel, and a second of the two or more system pulsation dampeners disposed within the standpipe.

7. The fluid delivery system of claim 6, further comprising:

a standpipe manifold located downstream from the at least one fluid pump and configured to receive the pumped fluid from the at least one fluid pump.

8. The fluid delivery system of claim 7, wherein the two or more system pulsation dampeners receive fluid from a plurality of fluid pumps including the at least one fluid pump.

9. The fluid delivery system of claim 6, wherein the two or more system pulsation dampeners are configured to provide pulsation dampening for fluid from a plurality of fluid pumps.

10. The fluid delivery system of claim 6, wherein at least one of the two or more system pulsation dampeners comprises an orifice assembly.

11. A fluid delivery method, comprising:

pumping fluid using at least one fluid pump;

receiving the pumped fluid pumped by the at least one fluid pump in a standpipe at a first end of the standpipe;

receiving fluid from a second end of the standpipe at an entry pipe or hose for one of a top drive or a swivel and transferring the received, pumped fluid to the one of the top drive or the swivel; and dampening pulsations within the received fluid using a system pulsation dampener connected within the entry pipe or hose for the one of the top drive or the swivel, the system pulsation dampener configured to facilitate signal detection for one of measurement while drilling (MWD) or logging while drilling (LWD) operations.

12. The fluid delivery method of claim 11, comprising:

receiving the pumped fluid from the at least one fluid pump at a standpipe manifold; and dampening pulsations within the pumped fluid downstream from the standpipe manifold using a system pulsation dampener disposed within the standpipe.

13. The fluid delivery method of claim 12, wherein the standpipe manifold is configured to combine the pumped fluid from the at least one fluid pump with fluid from another fluid pump.

14. The fluid delivery method of claim 13, wherein the standpipe manifold is configured to output a single combined fluid including the pumped fluid from the at least one fluid pump and the fluid from the other fluid pump.

15. The fluid delivery method of claim 13, wherein an additional pulsation dampener is connected at an outlet of the at least one fluid pump.

16. A fluid delivery method, comprising:

pumping fluid using at least one fluid pump;

receiving fluid pumped by the at least one fluid pump at a first end of a standpipe;

transferring the received fluid from a second end of the standpipe to an entry pipe or hose for one of a top drive or a swivel coupled between the second end of the standpipe and borehole piping within a borehole; and dampening pulsations within the received fluid using two or more system pulsation dampeners configured to facilitate signal detection for one of measurement while drilling (MWD) or logging while drilling (LWD) operations, wherein the two or more system pulsation dampeners comprise:

a first of the two or more system pulsation dampeners in the entry pipe or hose for the top drive or the swivel, and a second of the two or more system pulsation dampeners disposed within the standpipe.

17. The fluid delivery method of claim 16, further comprising:

receiving fluid from the at least one fluid pump at a standpipe manifold.

18. The fluid delivery method of claim 17, wherein the standpipe manifold receives fluid from a plurality of fluid pumps including the at least one fluid pump.

19. The fluid delivery method of claim 16, wherein the two or more system pulsation dampeners are configured to provide pulsation dampening for fluid from a plurality of fluid pumps.

20. The fluid delivery method of claim 16, wherein at least one of the two or more system pulsation dampeners comprises an orifice assembly.

* * * * *